Sept. 19, 1961  R. G. BLACK  3,001,004
ELECTRICAL COMPONENTS COMPRISING RESIN CAST INSIDE A SHELL
Filed July 23, 1959

WITNESSES:
Bernard R. Gieguey
James F. Young

INVENTOR
Richard G. Black
BY
ATTORNEY

# United States Patent Office 3,001,004
Patented Sept. 19, 1961

3,001,004
ELECTRICAL COMPONENTS COMPRISING RESIN CAST INSIDE A SHELL
Richard G. Black, Churchill Boro, Pa., assignor to Westinghouse Electric Corporation, East Pittsburgh, Pa., a corporation of Pennsylvania
Filed July 23, 1959, Ser. No. 828,991
7 Claims. (Cl. 174—137)

This invention relates, generally, to electrical components and, more particularly, to components which are formed by casting a resin inside a shell of a material other than the resin.

Casting resins are frequently utilized for electrical insulation in applications which require the resin to be poured into a shell which serves as a mold during the curing process. The mold is sometimes removed thereafter for reuse, but in certain applications is allowed to remain with the casting. When more than an ounce or so of resin is used for such casting, the volumetric shrinkage during curing is of such a magnitude that separation usually occurs between the body of resin and the walls of the shell. This makes no difference when the only function of the shell is to serve as a mold or as mechanical protection, but when a tight and continuous bond is required between the resin and the container it creates a problem. It is particularly serious in cases where the shell is of metal which is insulated by the resin from an internal conductor maintained at high electrical potential, as in certain insulating bushings. Any voids between the resin and the metal under such circumstances may give rise to the phenomenon of internal corona, thereby causing radio interference.

An object of the invention is to prevent the formation of shrinkage voids in cast resin insulating bushings and other electrical components.

Another object of the invention is to utilize a structural part of an electrical component as a mold for casting the component.

Other objects of the invention will be explained fully hereinafter or will be apparent to those skilled in the art.

In accordance with the invention, separation of a casting resin from a shell during curing is prevented by perforating or slotting the shell in such a manner that the shell can shrink with the resin and remain in total contact therewith.

For a better understanding of the nature and objects of the invention, reference may be had to the following detailed description, taken in conjunction with the accompanying drawing in which.

Figure 1:
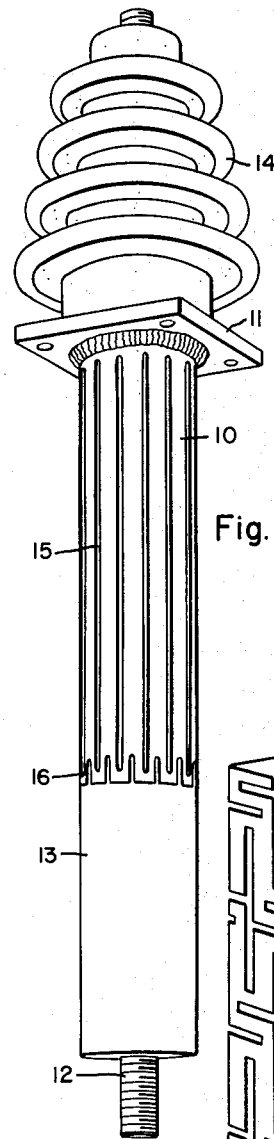
FIGURE 1 is a view, in elevation of an insulating bushing embodying the principal features of the invention.
Figure 2:
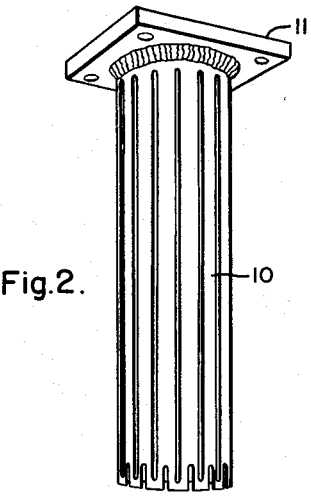
FIG. 2 is a view, in elevation, of a grounding flange and metal sleeve utilized in the bushing shown in FIG. 1.

Referring to the drawing, and particularly to FIG. 1, the terminal bushing shown therein is of the type fully described in a copending application of C. F. Sonnenberg, Serial No. 829,091, filed July 23, 1959. The bushing comprises a cylindrical metal sleeve 10 which is secured to a metal mounting flange 11, a conductor 12 which extends longitudinally through the sleeve 10 and is spaced from the sleeve, a thermoset resin body 13 and a porcelain casing 14. The sleeve 10 and mounting flange 11 are preferably composed of aluminum since aluminum has substantially the same thermal coefficient of expansion as the thermoset resin material utilized in casting the body. If a resin having a different coefficient of expansion is utilized, the sleeve 10 should be composed of a metal having substantially the same coefficient of expansion as the resin body. In all cases the metal shell should not have a coefficient of expansion markedly different from the resin utilized. As shown in FIGS. 1 and 2, the sleeve 10 is welded to the flange 11. However, the sleeve 10 and the flange 11 may be formed as one piece.

As described in the aforesaid copending application, a removable mold (not shown) is provided at the lower end of the sleeve 10. As also described in the copending application, the porcelain casing 14 may be utilized as part of the mold for casting the resin body 13. In order to prevent voids from forming between the resin body 13 and the casing 14 during the curing process, the casing is lined with a flexible and elastic material, such as, silicone rubber or a neoprene base rubber cement.

The thermoset resin utilized for the body 13 should be one that has good physical strength, a relatively low shrinkage during curing, and has good adherence to metal and ceramic, such as porcelain and glass. Polyester resin compositions and any of the thermosetting casting resins commonly utilized for electrical insulation may be utilized in the present structure. The resinous polymeric epoxides such as a thermosetting resin comprising a glycidyl polyether of a polyhydric phenol having a 1, 2 epoxy equivalency of between 1 and 2, have been found to meet the foregoing requirements and have been successfully utilized in making bushings of the present type. Such epoxide resins are described in U.S. Patents 2,728,744 and 2,739,134.

As explained in the aforesaid copending application, the metal sleeve 10 and the grounding flange 11 are provided to distribute the voltage stress over a greater surface area. In the present structure, the sleeve 10 is utilized as part of the mold for casting the resin.

As shown in FIGS. 1 and 2, the sleeve 10 is provided with a plurality of longitudinal slots 15 and 16 around the periphery of the sleeve. These slots permit the adhesion of the resin to the metal to pull the segments of the metal shell inwardly during the curing process, thereby preventing shrinkage of the resin from forming voids between the metal shell and the resin. When the bushing is utilized for a relatively high voltage service, any voids between the resin and the metal may give rise to the phenomenon of internal corona, causing radio interference. When the metal sleeve is slotted, in the manner shown, the metal contracts with the resin during curing, thereby preventing the formation of voids between resin and the metal.

When the slots are provided in the metal sleeve, a rubber sleeve or other temporary means, such as aluminum foil, may be provided around the sleeve 10 to retain the resin within the sleeve during the casting process. The temporary molds may be removed after the resin is cured.

An insulating bushing having a resin body cast inside a slotted metal sleeve was tested for radio interference and the results compared with the radio interference of a bushing in which an impregnated fibrous material was utilized as the insulation. The cast resin bushing caused much less radio interference at the higher voltages. Thus, the present bushing is more suitable for high voltage service than bushings of a prior construction in which the insulation was an impregnated fibrous material.

Figure 3:
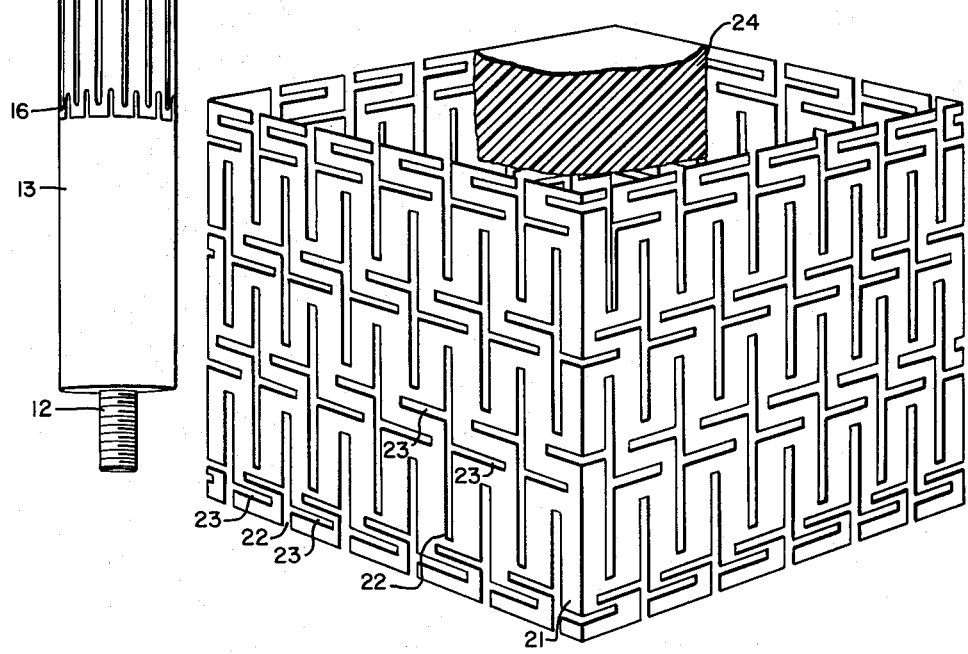
FIG. 3 is an isometric view of a metal shell which may be utilized for casting a component of an electrical system.

The metal shell shown in FIG. 3, and which is of a box-like shape, may be utilized as a mold for containing a casting resin for encasing electrical components of an electrical system. As shown in FIG. 3, a casing or shell 21 has a plurality of slots 22, each of which has a perpendicularly extending portion 23. The slots are so disposed that parallel portions of the different slots overlap each other. Thus, when a resin 24 is cast inside the shell the resin does not shrink from the shell during the curing process since the shell can contract with the resin. In this manner, voids are prevented from forming between the resin and the shell in the same manner as with the cylindrical sleeve 10 in which the slots 15 and 16 have overlapping portions.

The shell 21 may be formed by punching the slots in a sheet of metal prior to its being formed into the box-like shape. As previously explained, aluminum foil may be placed around the shell 21 to prevent the resin from coming out through the slots when it is poured into the shell. The foil may be removed after the resin is cured.

From the foregoing description, it is apparent that the present invention permits a shell or container used as a mold for casting resin to shrink with the resin during the curing process, thereby avoiding separation of the resin and the container. This structure provides increased mechanical strength and eliminates or greatly reduces a source of radio interference if the shell is of metal and forms part of a high voltage insulating device. Terminal bushings and other electrical components may be constructed in the manner herein described.

Since numerous changes may be made in the above described construction, and different embodiments of the invention may be made without the departing from the spirit and scope thereof, it is intended that all matter contained in the foregoing description or shown in the accompanying drawings shall be interpreted as illustrative and not in a limiting sense.

I claim as my invention:

1. An electrical component comprising a shell having a plurality of slots therein, a thermoset epoxy resin body adhered to the inside of the shell, said shell being composed of a material having substantially the same coefficient of expansion as the resin in said body, and said slots having parallel overlapping portions to permit the shell to contract with the resin.

2. An electrical component comprising a metal shell having a plurality of slots around its periphery, a thermoset resin body adhered to the inside of the shell, and said slots having overlapping portions to permit the shell to contract during shrinkage of the resin.

3. An electrical component comprising a cylindrical metal shell having a plurality of elongated longitudinal slots therein, a thermoset epoxy resin body adhered to the inside of the shell, and said slots permitting the shell to contract during contraction of the resin.

4. An electrical component comprising a cylindrical sheet metal shell having a plurality of longitudinal slots around its surface, a thermoset epoxy resin body adhered to the inside of the shell, and said slots having overlapping portions to permit the shell to contract with the resin.

5. An electrical component comprising a box-like shell having a plurality of slots therein, a thermoset epoxy resin body adhered to the inside of the shell, said shell being composed of a material having substantially the same coefficient of expansion as the resin in said body, and said slots having angularly disposed portions.

6. An electrical component comprising a box-like metal shell having a plurality of slots therein, a thermoset epoxy resin body adhered to the inside of the shell, and said slots having parallel overlapping portions to permit the shell to contract with the resin.

7. An electrical component comprising a box-like sheet metal shell having a plurality of slots therein, a thermoset epoxy resin body adhered to the inside of the shell, and said slots having perpendicular and parallel portions to permit the shell to contract in at least two directions during shrinkage of the resin.

References Cited in the file of this patent

UNITED STATES PATENTS

| | | |
|---|---|---|
| 1,118,738 | Carroll | Nov. 24, 1914 |
| 1,489,369 | Steinberger | Apr. 8, 1924 |
| 1,767,421 | Wirth | June 24, 1930 |
| 2,809,228 | Dutton | Oct. 8, 1957 |

FOREIGN PATENTS

| | | |
|---|---|---|
| 1,079,048 | France | May 19, 1954 |